United States Patent [19]

Asayama

[11] Patent Number: 5,634,662
[45] Date of Patent: Jun. 3, 1997

[54] STEERING SHAFT ASSEMBLY OF TELESCOPIC TYPE

[75] Inventor: Kazuhiro Asayama, Nisshin, Japan

[73] Assignee: Toyota Jidosha Kabushiki Kaisha, Toyota, Japan

[21] Appl. No.: 574,909

[22] Filed: Dec. 19, 1995

[30] Foreign Application Priority Data

Dec. 21, 1994 [JP] Japan .................................. 6-318881

[51] Int. Cl.$^6$ ................................................. B62D 1/19
[52] U.S. Cl. ......................................... 280/777; 74/492
[58] Field of Search ................................. 280/775, 777; 74/492

[56] References Cited

U.S. PATENT DOCUMENTS

| | | | |
|---|---|---|---|
| 3,434,367 | 3/1969 | Renneker et al. | 280/777 |
| 3,508,633 | 4/1970 | Nishimura et al. | 74/492 |
| 4,086,825 | 5/1978 | Badcock et al. | 74/492 |
| 4,531,619 | 7/1985 | Eckels | 188/371 |
| 4,619,548 | 10/1986 | Kazaoka et al. | 403/290 |
| 5,035,307 | 7/1991 | Sadeghi et al. | 280/777 |
| 5,368,330 | 11/1994 | Arnold et al. | 280/777 |

FOREIGN PATENT DOCUMENTS 36 33 732 A1  4/1987  Germany .
56-27175  3/1981  Japan .

*Primary Examiner*—Kenneth R. Rice
*Attorney, Agent, or Firm*—Oliff & Berridge

[57] ABSTRACT

A steering shaft assembly of the telescopic type having a lower shaft rotatably supported in place within a stationary lower column tube, an upper shaft rotatably supported in place within an upper column tube axially movably coupled within the lower column tube and provided thereon with a steering wheel, the upper shaft being telescopically connected to the lower shaft in such a manner as to restrict relative rotation to the lower shaft, and a lock mechanism for releasably fastening the upper column tube to the lower column tube at an adjusted position, wherein a shock absorbing mechanism is provided in combination with the lock mechanism for absorbing an impact force applied to the steering wheel.

4 Claims, 7 Drawing Sheets

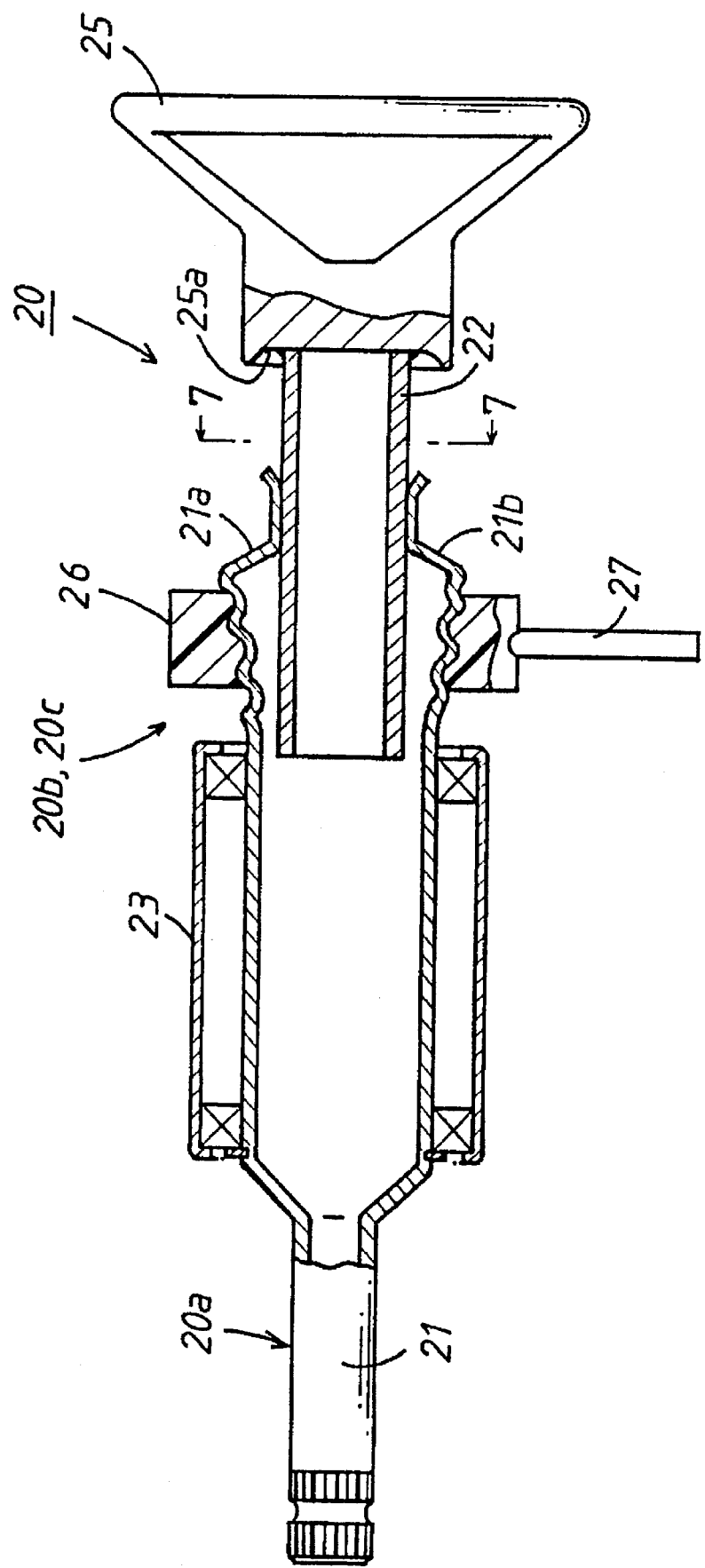

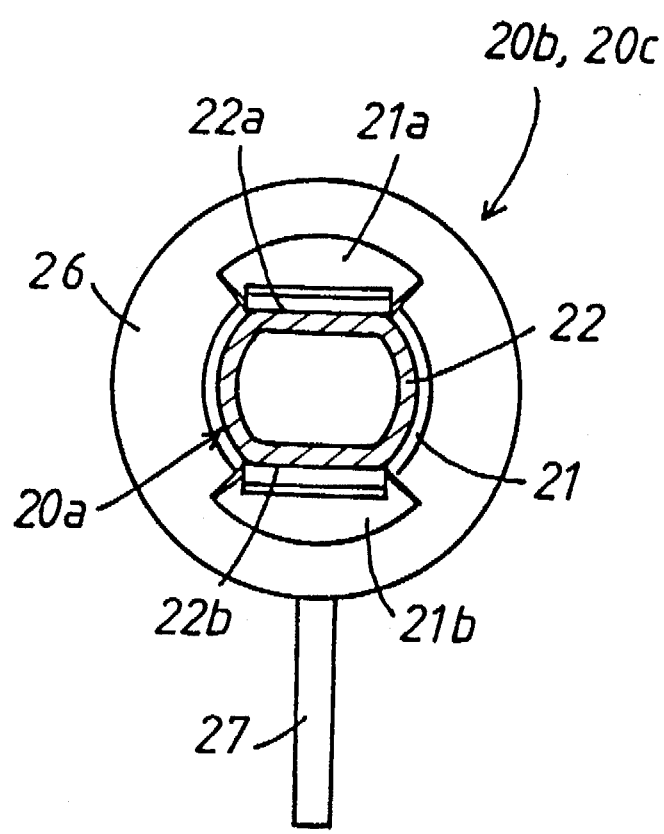

STEERING SHAFT ASSEMBLY OF TELESCOPIC TYPE

BACKGROUND OF THE INVENTION

1. Field of the Invention

The present invention relates to a steering shaft assembly for automotive vehicles, and more particularly to a steering shaft assembly of the telescopic type adjustable in its axial direction.

2. Description of the Prior Art

Disclosed in Japanese Utility Model Laid-open Publication 56(1981)-27175 is a steering shaft assembly of the telescopic type which comprises a lower shaft operatively connected to a steering gear box, an upper shaft telescopically connected to the lower shaft for axial adjustment in such a manner as to restrict relative rotation to the lower shaft and provided thereon with a steering wheel, and a lock mechanism for releasably fastening the upper shaft to the lower shaft at an adjusted position. In the steering shaft assembly, the upper shaft is in the form of a hollow shaft having a lower end portion formed as a pair of diametrically opposed deformable portions for engagement with an outer periphery of the lower shaft, and the lock mechanism is comprised of a tubular fastening member threaded over the hollow upper shaft. The tubular fastening member is formed with a tapered female screw portion in engagement with tapered male screws formed on the deformable portions of the hollow upper shaft. When the tubular fastening member is rotated by operation of a manual lever connected thereto to radially inwardly tighten the deformable portions of the hollow upper shaft to the outer periphery of the lower shaft, the upper shaft is locked at an adjusted position.

In this kind of steering shaft assemblies, it is desired to provide a shock absorbing mechanism for absorbing a forward impact applied in excess to the steering wheel. In the steering shaft assembly described above, it is, however, difficult to provide such a shock absorbing mechanism in combination with the lock mechanism. If the shock absorbing mechanism was provided separately from the lock mechanism, the steering shaft assembly would become complicated in construction.

SUMMARY OF THE INVENTION

It is, therefore, an object of the present invention to provide a steering shaft assembly of the telescopic type wherein a shock absorbing mechanism is provided in combination with a lock mechanism in a simple construction.

According to the present invention, there is provided a steering shaft assembly of the telescopic type having a lower shaft rotatably supported in place within a stationary lower column tube, an upper shaft rotatably supported in place within an upper column tube axially movably coupled with the lower column tube and provided thereon with a steering wheel, the upper shaft being telescopically connected to the lower shaft in such a manner as to restrict relative rotation to the lower shaft, and a lock mechanism for releasably fastening the upper column tube to the lower column tube at its adjusted position, wherein the lock mechanism comprises an axially deformable portion integrally formed with one of the column tubes for engagement with an outer periphery of the other column tube and fastening means for releasably fastening the deformable portion of the column tube to the outer periphery of the other column tube at an adjusted position, and wherein a shock absorbing mechanism in combination with the lock mechanism is comprised of the deformable portion of the column tube and abutment means provided on the other column tube to be abutted against the deformable portion of the column tube when applied with an impact acting on the steering wheel.

According to an aspect of the present invention, the lock mechanism comprises a pair of diametrically opposed axially deformable portions integrally formed with an upper end of the lower column tube for engagement with an outer periphery of the upper column tube and fastening means for releasably fastening the deformable portions of the lower column tube to the outer periphery of the upper column tube at an adjusted position, and the abutment means of the shock absorbing mechanism comprises a pair of radial hook portions integrally formed with the upper column tube to be abutted against the deformable portions of the lower column tube when applied with an impact acting on the steering wheel.

According to another aspect of the present invention, there is provided a steering shaft assembly of the telescopic type having a tubular lower shaft for connection to a steering gear box at its lower end, a tubular upper shaft telescopically coupled with the lower shaft in such a manner as to restrict relative rotation to the lower shaft and provided thereon with a steering wheel, and a lock mechanism for releasably fastening the upper shaft to the lower shaft at its adjusted position, wherein the lock mechanism comprises an axially deformable portion integrally formed with one of the lower and upper shafts for engagement with an outer periphery of the other shaft and fastening means for releasably fastening the deformable portion of the shaft to the outer periphery of the other shaft at an adjusted position, and wherein a shock absorbing mechanism in combination with the lock mechanism is comprised of the deformable portion of the shaft arranged to be deformed by abutment against the steering wheel when applied with an impact acting on the steering wheel.

According to a further aspect of the present invention, the lock mechanism comprises a pair of diametrically opposed deformable portions integrally formed with an upper end of the lower shaft for engagement with an outer periphery of the upper shaft and fastening means for releasably fastening the deformable portions of the lower shaft to the outer periphery of the upper shaft at an adjusted position, and the shock absorbing mechanism is comprised of the deformable portions of the lower shaft arranged to be deformed by abutment against the steering wheel when applied with an impact acting on the steering wheel.

BRIEF DESCRIPTION OF THE DRAWINGS

Other objects, features and advantages of the present invention will be more readily appreciated from the following detailed description of preferred embodiments thereof when taken together with the accompanying drawings, in which:

FIG. 6 is a sectional view of another embodiment of a steering shaft assembly in accordance with the present invention; and FIG. 7 is a cross-sectional view taken along line 7—7 in FIG. 6.

DESCRIPTION OF THE PREFERRED EMBODIMENTS

Figure 1:
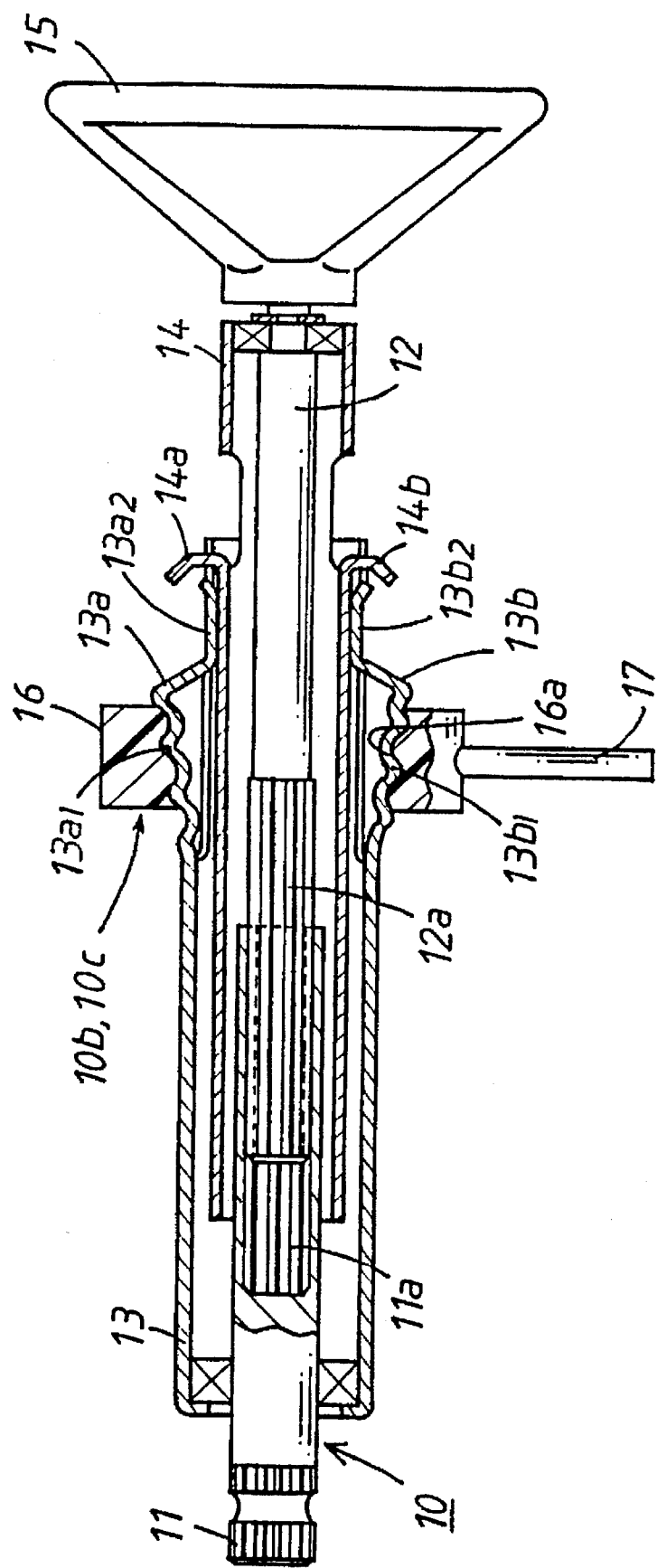
FIG. 1 is a sectional view of a steering shaft assembly in accordance with the present invention.

In FIGS. 1-4 of the drawings, there is illustrated a steering shaft assembly 10 of the telescopic type is accordance with the present invention which includes a lower shaft 11, an upper shaft 12, a lower column tube 13 and an upper column tube 14. The lower shaft 11 is in the form of a hollow shaft which is formed with internal axial serration 11a and operatively connected at its lower end to a steering gear box (not shown). The upper shaft 12 is in the form of a solid shaft which has a lower end portion formed with external axial serration 12a for slidable engagement with the internal axial serration 11a of lower shaft 11 and an upper end provided thereon with a steering wheel 15.

The upper shaft 12 is telescopically connected at its lower end portion with the upper end portion of lower shaft 11 for axial adjustment in such a manner as to restrict relative rotation to the lower shaft 11. The lower column tube 13 is in the form of a stationary column tube which is anchored at an angle to a portion of a vehicle body structure (not shown). The upper column tube 14 is axially movably coupled within the lower column tube 13. The lower shaft 11 is rotatably supported at its lower portion by means of a ball bearing which is fixedly mounted within the lower column tube 13, while the upper shaft 12 is rotatably supported at its upper end portion by means of a ball bearing which is fixedly mounted within the upper column tube 14 in such a manner as to restrict axial movement of the upper shaft 12. In the steering shaft assembly 10, a lock mechanism 10b is provided in combination with an a shock absorbing mechanism 10c at an interconnected portion of the lower and upper column tubes 13 and 14.

The lock mechanism 10b is comprised of a pair of diametrically opposed axially deformable screw portions 13a, 13b integrally formed with an upper end portion of lower column tube 13, an annular fastening nut 16 and a manual lever 17. As can be well seen in FIG. 2, the deformable screw portions 13a and 13b each are formed in a waveform by cutting the upper end portion of lower column tube 13 in a predetermined width and pressing the cut portions in an axial direction. Thus, the deformable screw portions 13a and 13b are located within slit portions 13c, 13d formed in the upper end portion of lower column tube 13 and opposed to one another. The deformable screw portions 13a and 13b each are waved from its base end toward its distal end and bent radially inwardly for engagement with the outer periphery of upper column tube 14. The waved deformable screw portions 13a, 13b are formed as tapered male screw portions 13a1, 13b1 the distal ends of which are formed as fastening portions 13a2, 13b2 to be releasably tightened to the outer periphery of upper column tube 14. The annular fastening nut 16 is made of synthetic resin and formed at its inner periphery with a tapered female screw 16a for engagement with the male screw portions 13a1, 13b1 of deformable portions 13a, 13b. The manual lever 17 is connected to the fastening nut 16 to be operated by a user for positional adjustment of the steering wheel 15.

Figure 2:
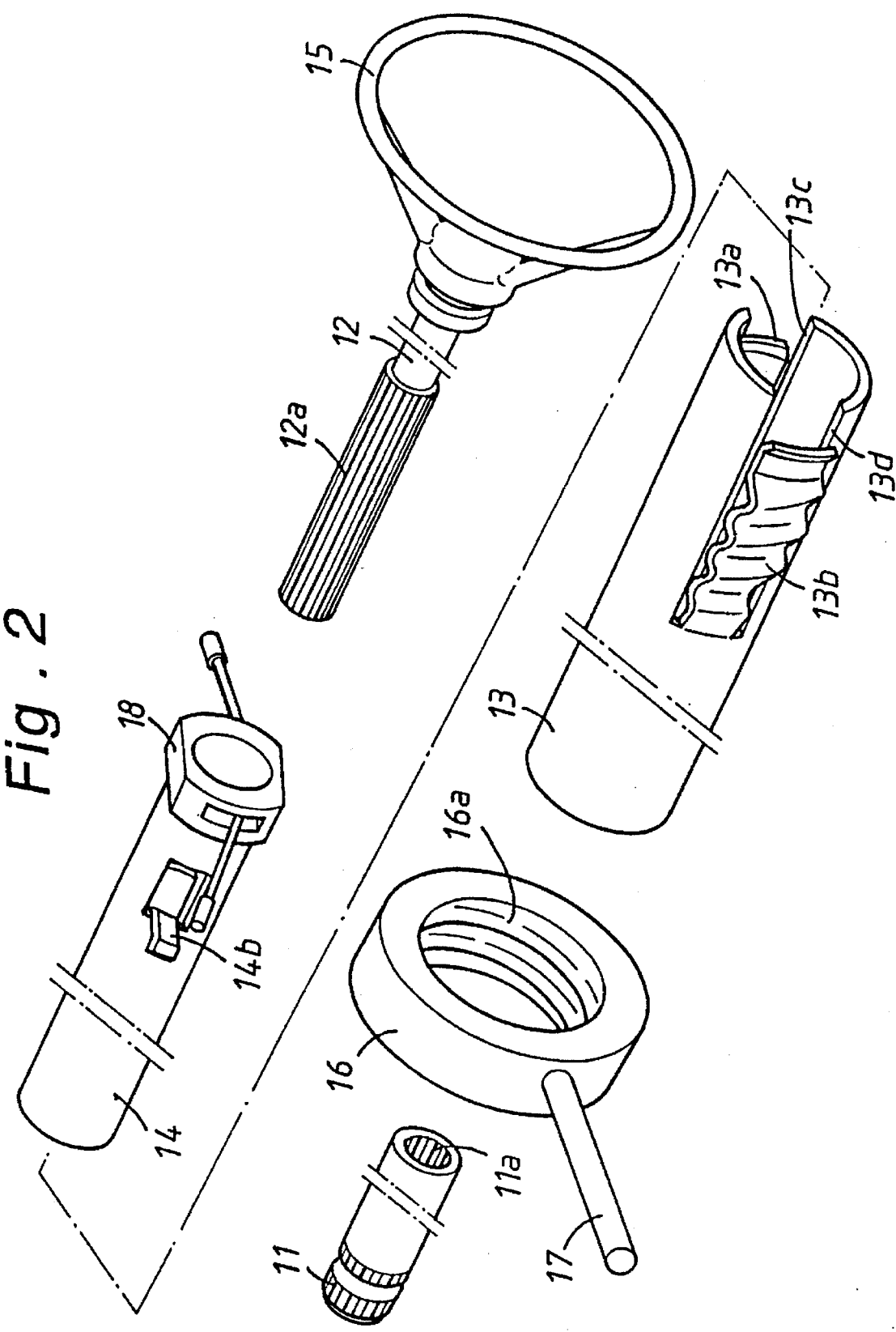
FIG. 2 is a perspective view illustrating disassembled component parts of the steering shaft assembly.

The shock absorbing mechanism 10c is comprised of the waved deformable screw portions 13a, 13b of lower column tube 13 and a pair of radial hook portions 14a, 14b integrally formed with the upper column tube 14 at an intermediate portion thereof. The waved deformable screw portions 13a, 13b of lower column tube 13 are resiliently deformable in a radial direction and plastically deformable in an axial direction along with the waved configuration. The radial hook portions 14a, 14b of upper column tuber 14 are placed in the slit portions 13c, 13d of lower column tube 13 and opposed to the distal ends of deformable screw portions 13a, 13b. In FIG. 2, the reference numeral 18 designates a switch assembly of a light switch, a washer switch and the like.

Figure 3:
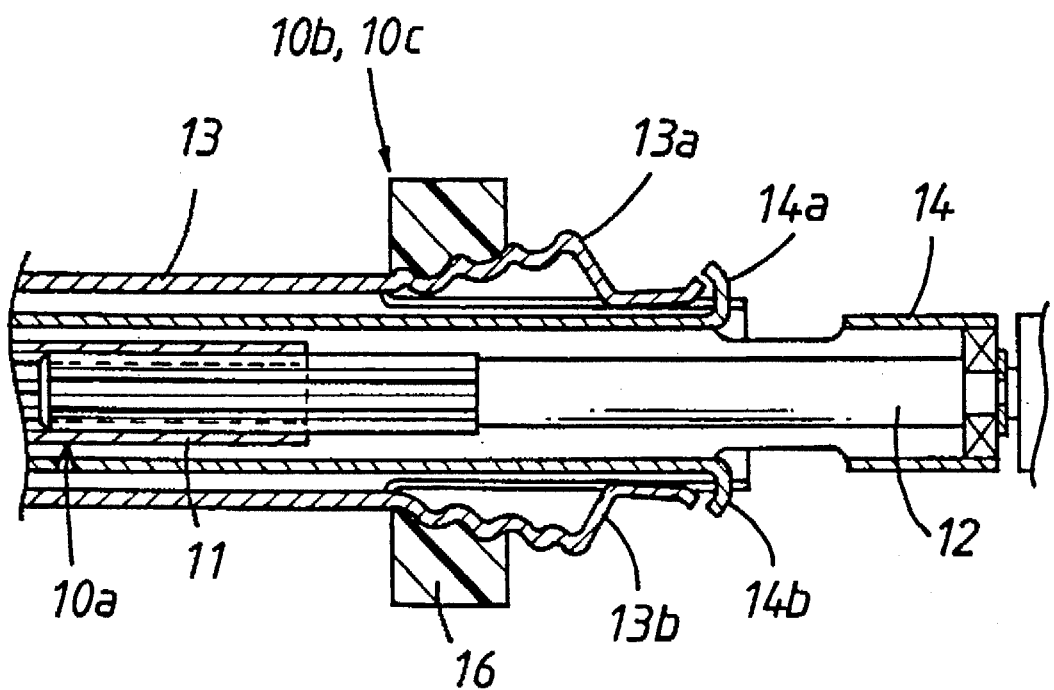
FIG. 3 is a sectional view illustrating a released condition of a lock mechanism shown in FIG. 1.

In the steering column assembly described above, the deformable screw portions 13a, 13b of lower column tube 13 are radially inwardly tightened by the fastening nut 16 to fix the upper column tube 14 at an adjusted position by engagement therewith at their fastening portions 13a2, 13b2. Thus, the upper column tube 14 is locked to the lower column tube 13 at the adjusted position to restrict axial movement of the upper shaft 12 relative to the lower shaft 11. When the manual lever 17 is operated by the user to advance the fastening nut 16 downward to radially outwardly expand the fastening portions 13a2, 13b2 of lower column tube 13 as shown in FIG. 3, the upper column tube 14 is released from the lower column tube 13. In such a released condition, the upper shaft 12 can be axially moved with the upper column tube 14 to adjust the position of the steering wheel 15.

After adjustment of the steering wheel 15 to a desired position, the manual lever 17 is operated by the user to advance the fastening nut 16 upward so that the deformable portions 13a, 13b of lower column tube 13 are radially inwardly tightened to the outer periphery of upper column tube 14 at their fastening portions 13a2, 13b2. Thus, the upper column tube 14 is locked to the lower column tube 13 at an adjusted position to restrict axial movement of the upper shaft 12 relative to the lower shaft 11.

Figure 4:
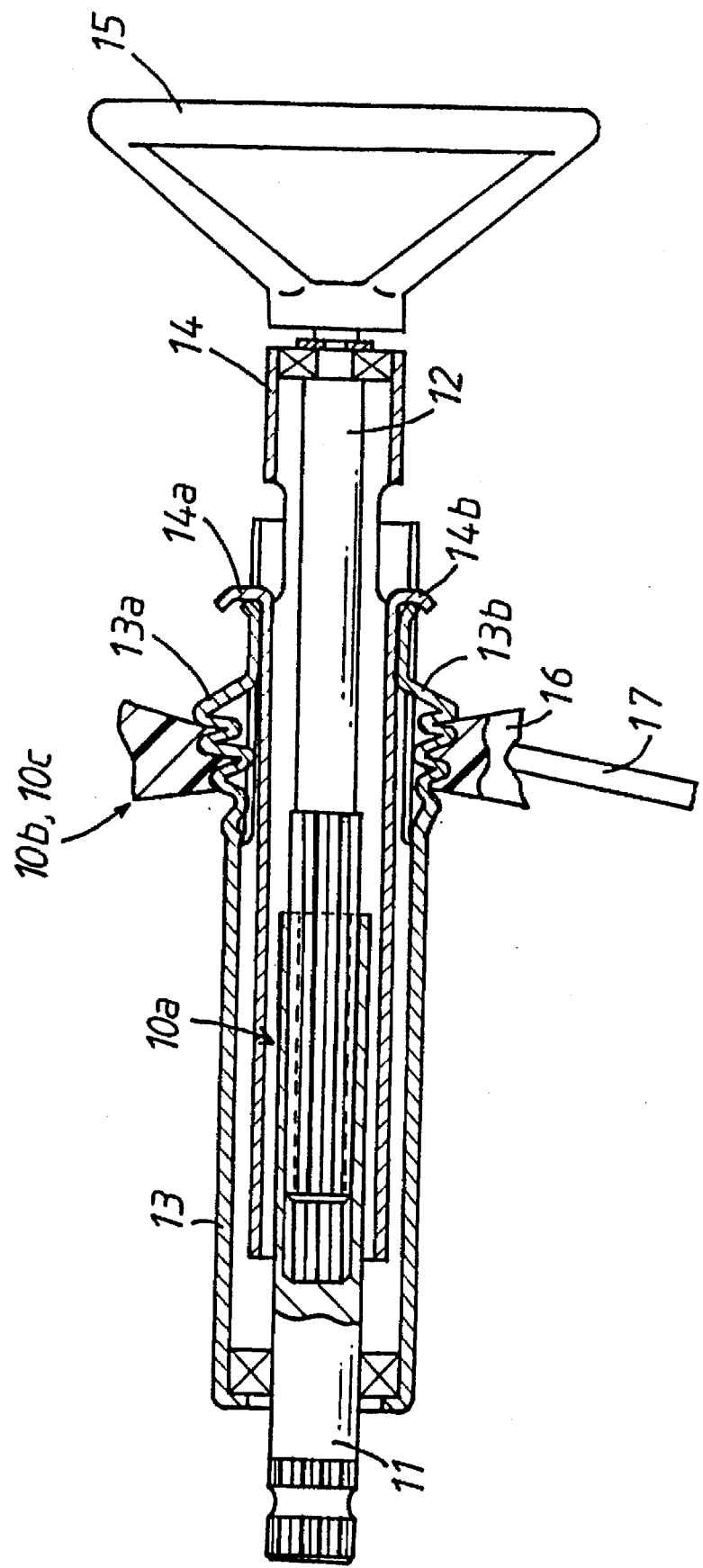
FIG. 4 is a sectional view illustrating a deformed condition of a shock absorbing mechanism in combination with the lock mechanism shown in FIG. 1.

If the steering wheel 15 is applied with a forward impact force in excess, the upper column tube 14 is moved forward against the tightening force of the fastening nut 16, and in turn, as shown in FIG. 4, the waved deformable portions 13a, 13b of lower column tube 13 are deformed or collapsed in an axial direction by abutment against the hook portions 14a, 14b of upper column tube 14. This causes the shock absorbing mechanism 10c to absorb the impact applied to the steering wheel 10a.

Since in the steering column assembly, the component parts and portions of the lock and shock absorbing mechanisms 10b and 10c such as the deformable portions 13a, 13b, fastening nut 16 and manual lever 17 are provided on the lower column tube 13, the lock and shock absorbing mechanisms 10b and 10c can be manufactured in a simple construction. In addition, the number of the component parts of the lock and shock absorbing mechanisms 10b and 10c can be reduced since the deformable portions 13a, 13b of lower column tube 13 are adapted as the common parts of the lock and shock absorbing mechanisms. In the shock absorbing mechanism 10c, a reaction force for absorption of the impact can be also adjusted by the configuration of the deformable portions 13a, 13b of lower column tube 13.

Figure 5:
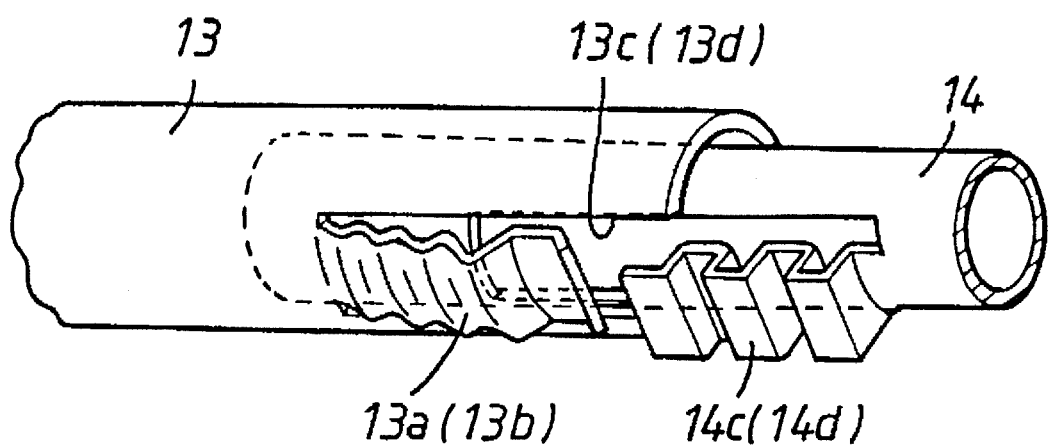
FIG. 5 is a perspective view of a modification of the shock absorbing mechanism shown in FIG. 1.

Illustrated in FIG. 5 is a modification of the shock absorbing mechanism 10c where in the hook portions 14a, 14b are replaced with a pair of diametrically opposed hook portions 14c, 14d which are waved in cross-section to be deformed in an axial direction when abutted against the deformable portions 13a, 13b of lower column tube 13 due to an impact acting on the steering wheel 15. In this modification, the waved hook portions 14c, 14d are useful to absorb a great impact acting on the steering wheel 15 and to restrict relative rotation of the upper column tube 14 to the lower column tube 13.

FIG. 6 illustrates another embodiment of a steering shaft assembly 20 in accordance with the present invention which includes a lower shaft 21, an upper shaft 22 and a stationary column tube 23. The lower shaft 21 is in the form of a tubular shaft which is formed with large and small diameter portions and connected at its lower end to a steering gear box (not shown). As shown in FIG. 7, the upper shaft 22 is in the form of a tubular shaft of oval cross-section which is formed with a pair of diametrically opposed flat portions 22a, 22b and provided thereon with a steering wheel 25.

The tubular lower shaft 21 is rotatably supported in place at its large diameter portion by means of a pair of axially spaced ball bearings which are fixedly mounted within the stationary column tube 23. The stationary column tube 23 is anchored at angle to a portion of a vehicle body structure (not shown) in the same manner as in the embodiment shown in FIG. 1. The tubular upper shaft 22 is axially movably coupled within the tubular lower shaft 21 and releasably fastened to the tubular lower shaft 21 at an adjusted position by means of a lock mechanism 20b. In this embodiment, the lock mechanism 20b is provided in combination with a shock absorbing mechanism 20c substantially in the same construction as in the embodiment shown in FIG. 1.

The lock mechanism 20b is comprised of a pair of diametrically opposed axially deformable portions 21a, 21b integrally formed with an upper end portion of tubular lower shaft 21. An annular fastening nut 26 and a manual lever 27. The deformable portions 21a, 21b of lower shaft 21 are formed substantially in the same manner as those in the embodiment of FIG. 1, and the fastening nut 26 and manual lever 27 are assembled with the deformable portions 21a, 21b of lower shaft 21 in the same manner as those in the embodiment of FIG. 1.

In the lock mechanism 20b, the manual lever 27 is operated by a user to advance the fastening nut 26 upward so that the deformable portions 21a, 21b of lower shaft 21 are radially inwardly tightened to the pair of flat portions 22a, 22b of upper shaft 22 at their fastening portions. Thus, the upper shaft 22 is locked to the lower shaft 21 at an adjusted position to transmit therethrough a steering effort applied to the steering wheel 25 to the lower shaft 21. When the manual lever 26 is operated to advance the fastening nut 26 downward to radially outwardly expand the deformable portions 21a, 21b of lower shaft 21, the upper shaft 21 is released from the lower shaft 21. In such a released condition, the upper shaft 21 can be axially moved to adjust the position of steering wheel 25.

In this embodiment, the shock absorbing mechanism 20c is comprised of the deformable portions 21a, 21b of lower shaft 21 the distal ends of which are opposed to an annular recess 25a formed in a front end of the steering wheel 25. If the steering wheel 25 is moved forward by an impact applied thereto, the deformable portions 21a, 21b of lower shaft 21 are deformed or collapsed by abutment against the front end of the steering wheel 25 at its annular recess 25a to absorb the impact.

As is understood from the above description, the steering shaft assembly 20 can be manufactured at a low cost in a more simple construction than the steering shaft assembly shown in FIG. 1.

What is claimed is:

1. A steering shaft assembly of the telescopic type having a lower shaft rotatably supported in place within a stationary lower column tube, an upper shaft rotatably supported in place within an upper column tube axially movably coupled with said lower column tube and provided thereon with a steering wheel, said upper shaft being telescopically connected to said lower shaft in such a manner as to restrict relative rotation to said lower shaft, and a lock mechanism for releasably fastening said upper column tube to said lower column tube at an adjusted position, wherein said lock mechanism comprises an axially deformable portion integrally formed with one of said column tubes for engagement with an outer periphery of the other column tube and fastening means for releasably fastening the deformable portion of the column tube to the outer periphery of the other column tube at an adjusted position, and wherein a shock absorbing mechanism in combination with said lock mechanism is comprised of the deformable portion of the column tube and abutment means provided on the other column tube to be abutted against the deformable portion of the column tube when applied with an impact acting on the steering wheel.

2. A steering shaft assembly of the telescopic type having a lower shaft rotatably supported in place within a stationary lower column tube, an upper shaft rotatably supported in place within an upper column tube axially movably coupled with said lower column tube and provided thereon with a steering wheel, said upper shaft being telescopically connected to said lower shaft in such a manner as to restrict relative rotation to said lower shaft, and a lock mechanism for releasably fastening said upper column tube to said lower column tube at an adjusted position, wherein said lock mechanism comprises a pair of diametrically opposed axially deformable portions integrally formed with an upper end of said lower column tube for engagement with an outer periphery of said upper column tube and fastening means for releasably fastening the deformable portions of said lower column tube to the outer periphery of said upper column tube at an adjusted position, and wherein a shock absorbing mechanism in combination with said lock mechanism is comprised of the deformable portions of said lower column tube and a pair of radial hook portions integrally formed with said upper column tube to be abutted against the deformable portions of said lower column tube when applied with an impact acting on said steering wheel.

3. A steering shaft assembly of the telescopic type having a tubular lower shaft for connection to a steering gear box, a tubular upper shaft telescopically coupled with said lower shaft in such a manner as to restrict relative rotation to said lower shaft and provided thereon with a steering wheel, and a lock mechanism for releasably fastening said upper shaft to said lower shaft at an adjusted position, wherein said lock mechanism comprises an axially deformable portion integrally formed with one of said lower and upper shafts for engagement with an outer periphery of the other shaft and fastening means for releasably fastening the deformable portion of the shaft to the outer periphery of the other shaft at an adjusted position, and wherein a shock absorbing mechanism in combination with said lock mechanism is comprised of the deformable portion of the shaft arranged to be abutted against said steering wheel when applied with an impact acting on said steering wheel.

4. A steering shaft assembly of the telescopic type having a tubular lower shaft for connection to a steering gear box, a tubular upper shaft telescopically coupled with said lower shaft in such a manner as to restrict relative rotation to said lower shaft and provided thereon with a steering wheel, and a lock mechanism for releasably fastening said upper shaft to said lower shaft at an adjusted position, wherein said lock mechanism comprises a pair of diametrically opposed axially deformable portions integrally formed with an upper end of said lower shaft for engagement with an outer periphery of said upper shaft and fastening means for releasably fastening the deformable portions of said lower shaft to the outer periphery of said upper shaft at an adjusted position, and wherein a shock absorbing mechanism in combination with said lock mechanism is comprised of the deformable portions of said lower shaft arranged to be deformed by abutment against said steering wheel when applied with an impact acting on said steering wheel.

* * * * *